US006895288B1

(12) United States Patent
Shen

(10) Patent No.: US 6,895,288 B1
(45) Date of Patent: May 17, 2005

(54) DEVICE FOR CONTROLLING TRACK LAMPS

(76) Inventor: Wei Hong Shen, 6F, No. 649-9, Chung Cheng Rd., Hsinchuang City, Taipei Hsien (TW)

( * ) Notice: Subject to any disclaimer, the term of this patent is extended or adjusted under 35 U.S.C. 154(b) by 0 days.

(21) Appl. No.: 10/755,362

(22) Filed: Jan. 13, 2004

(51) Int. Cl.[7] .................................................. G05B 15/00

(52) U.S. Cl. .............................. 700/83; 700/17; 700/65

(58) Field of Search .............................. 700/17, 65, 83, 700/20; 315/312, 294

(56) References Cited

U.S. PATENT DOCUMENTS 6,548,967 B1 * 4/2003 Dowling et al. ............ 315/318
6,655,817 B2 * 12/2003 Devlin et al. ............... 362/233
6,700,334 B2 * 3/2004 Weng ......................... 315/294
6,720,745 B2 * 4/2004 Lys et al. ................... 315/312
2003/0227485 A1 * 12/2003 Krakirian et al. ........... 345/771

* cited by examiner

*Primary Examiner*—Anthony Knight
*Assistant Examiner*—Ronald D Hartman, Jr.
(74) *Attorney, Agent, or Firm*—Rosenberg, Klein & Lee

(57) ABSTRACT

A device for controlling track lamps used to control the light-emitting order or brightness of the track lamps. The device includes: a low pass filter for obtaining a low-frequent signal from an input signal; a high pass filter for obtaining a high-frequent signal from the input signal; a microprocessor connected with the high pass filter to process the high-frequent signal; an Internet Protocol (IP) setting circuit connected with the microprocessor for providing a user to set the IP addresses of the track lamps; and pulse modulation processors for receiving the processed high-frequent signal sent from the microprocessor and modulating the pulse width of the processed high-frequent signal. Thereby, the light-emitting order, brightness or light-projecting angle can be controlled to enhance a presented light effect.

10 Claims, 5 Drawing Sheets

DEVICE FOR CONTROLLING TRACK LAMPS

FIELD OF THE INVENTION

The present invention is directed to a device for controlling track lamps, and more particularly, to a device for controlling the brightness and light-emitting order of track lamps to enhance the effect of light.

BACKGROUND OF THE INVENTION

Since Edison invented the first light bulb of the world, light bulbs have become the necessaries of life in the last centuries. Due to the light bulbs are convenient and possess high brightness, they are applied to various fields extensively.

Track lamps are a kind of improvement of the light bulbs. They are not only used for illumination. They are also handicraft products that can be applied to interior design to prettify the house. Besides, they can also be used to provide the light effect of the stage to make the performance more colorful and attractive.

The track lamp assembly is constituted by a track and track lamps. As shown in FIG. 1, which is a schematic diagram of a conventional track lamp assembly. Therein, the track lamps 20 are connected to the track 10 in a parallel matter. Besides, each of the track lamps 20 can be moved along the track 10 to change the illuminating angle. The power supply 15 is used to provide a low-frequent (60 Hz) electric power signal to the track lamps 20 via the track 10 to make the track lamps radiate for illumination.

However, since the track lamps 20 are connected in a parallel matter, all of the track lamps 20 on the track 10 have the same brightness and radiate at the same time. Hence, the track lamps can't be controlled to emit lights with different brightness, order or timing.

Accordingly, as discussed above, the conventional track lamps still have some drawbacks that could be improved. The present invention aims to resolve the drawbacks in the prior art.

SUMMARY OF THE INVENTION

An objective of the present invention is to provide a device for controlling track lamps to emit lights with different brightness, order or timing. The device includes: a low pass filter for obtaining a low-frequent signal from an input signal; a high pass filter for obtaining a high-frequent signal from the input signal; a microprocessor connected with the high pass filter to process the high-frequent signal; an Internet Protocol (IP) setting circuit connected with the microprocessor for providing a user to set the IP addresses of the track lamps; and pulse modulation processors for receiving the processed high-frequent signal sent from the microprocessor and modulating the pulse width of the processed high-frequent signal. Thereby, the light-emitting order, brightness or light-projecting angle can be controlled to enhance a presented light effect.

Numerous additional features, benefits and details of the present invention are described in the detailed description, which follows.

DETAILED DESCRIPTION

Figure 1:
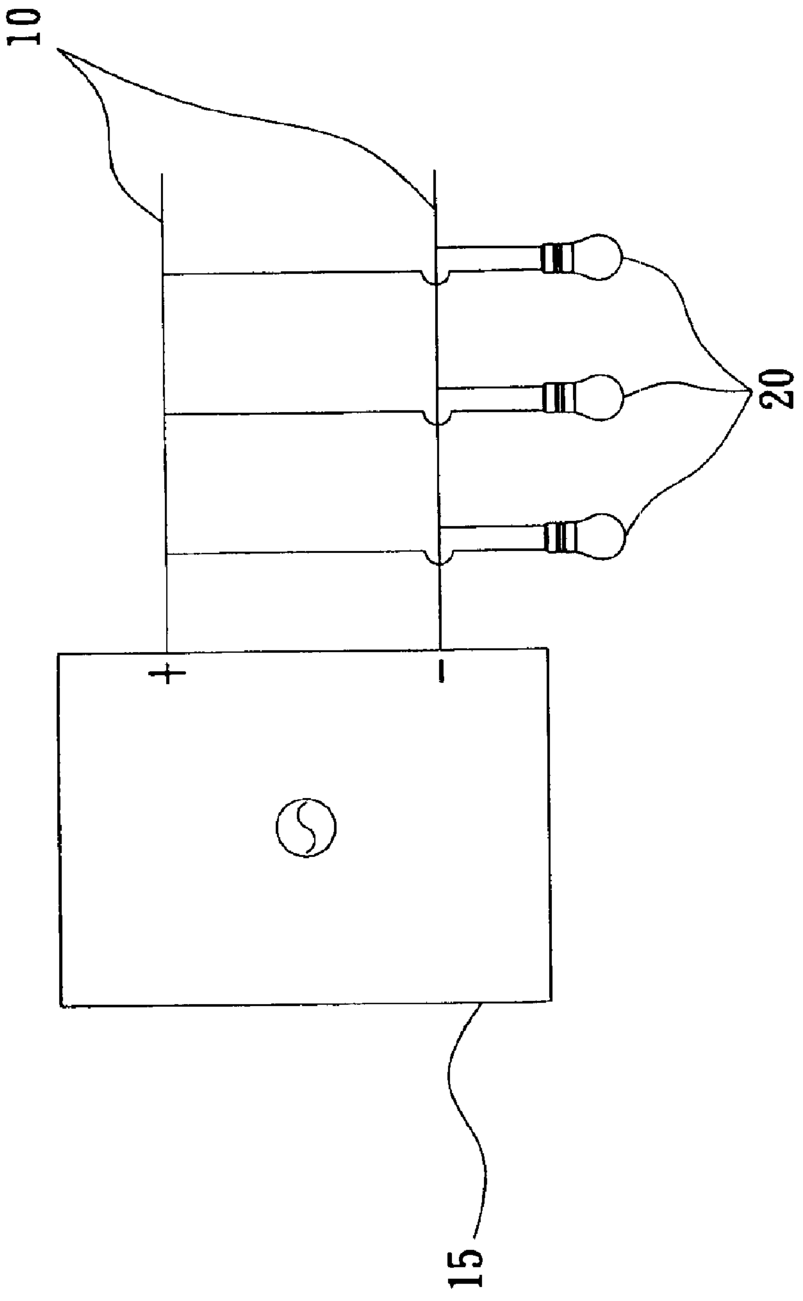
FIG. 1 PRIOR ART
FIG. 1 is a schematic diagram of a conventional track lamp assembly.
Figure 2:
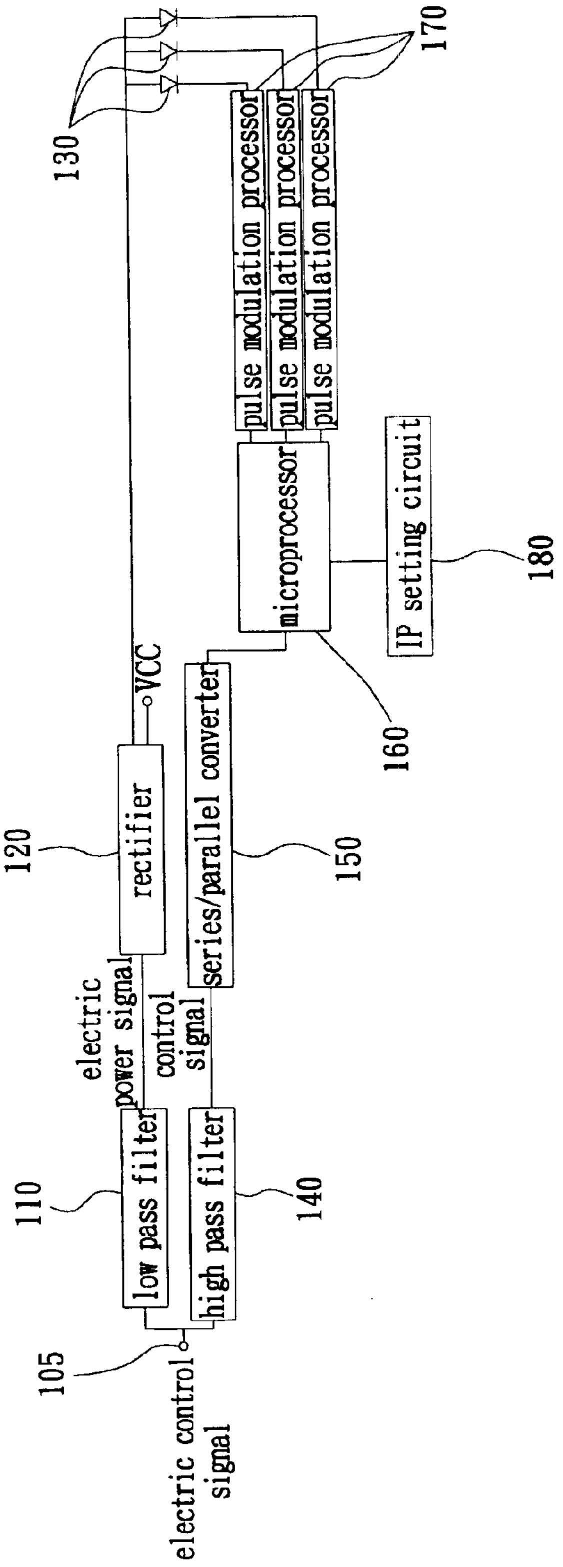
FIG. 2 is a circuit block diagram of a device for controlling track lamps complied with the present invention.

Please refer to FIG. 2, which is a circuit block diagram of a device for controlling track lamps complied with the present invention. Therein, an input signal, named electric control signal, is inputted to the device via a signal input terminal 105. The electric control signal includes a low-frequent electric power signal and a high-frequent control signal. When the electric control signal is passed to a low pass filter 110 and a high pass filter 140, the low-frequent electric power signal and high-frequent control signal are abstracted by the low pass filter 110 and the high pass filter 140, respectively.

When the low-frequent electric power signal passes the low pass filter 110, the electric power signal will be delivered to a rectifier 120, which is a rectifying circuit connected with the low pass filter 110, to rectify the electric power signal. After rectified, the electric power signal will be sent to track lamps 130 to provide them electric power. In practice, the track lamps can be replaced by light emitting diodes (LEDs).

When the high-frequent control signal passes the high pass filter 140, the control signal will be delivered to the series/parallel converter 150 to convert serial control signals into parallel control signals. Then, the converted signals will be sent to a microprocessor 160 for processing. The microprocessor 160 further connects an Internet Protocol (IP) setting circuit 180, which is a man-machine interface, to provide a user to set the number of order and IP addresses of the track lamps 130. In practice, the IP setting circuit 180 is capable of setting the IP addresses and order of the tack lamps 130 via a computer, cellular phone, personal digital assistant (PDA) or a control panel.

When the signals from the series/parallel converter 150 and IP setting circuit 180 are processed by the microprocessor 160, they will be passed to the pulse modulation processor 170 to modulate their pulse width and then sent to corresponding track lamps 130 to make the track lamps 130 emit light according to the preset order, brightness or projecting angle.

Figure 3A:
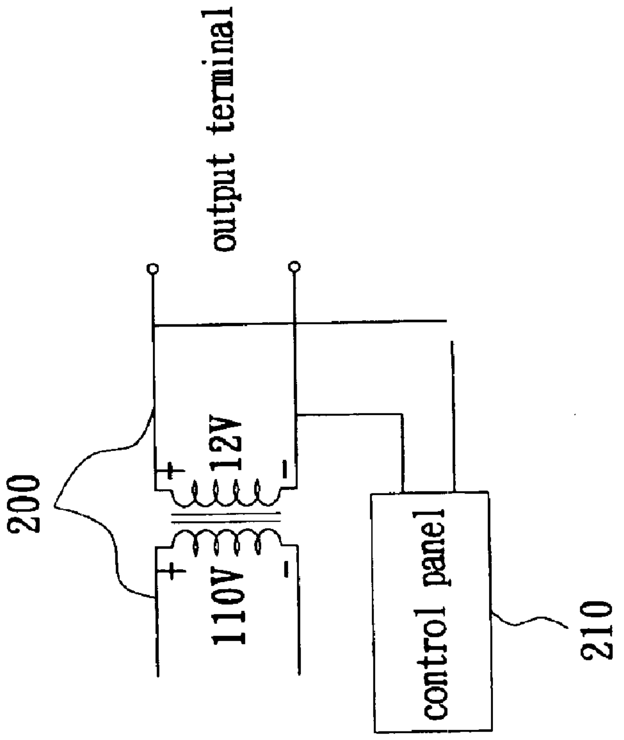
FIG. 3*a* is a schematic diagram of a circuit for generating the electric control signal in accord with the present invention.
Figure 3B:
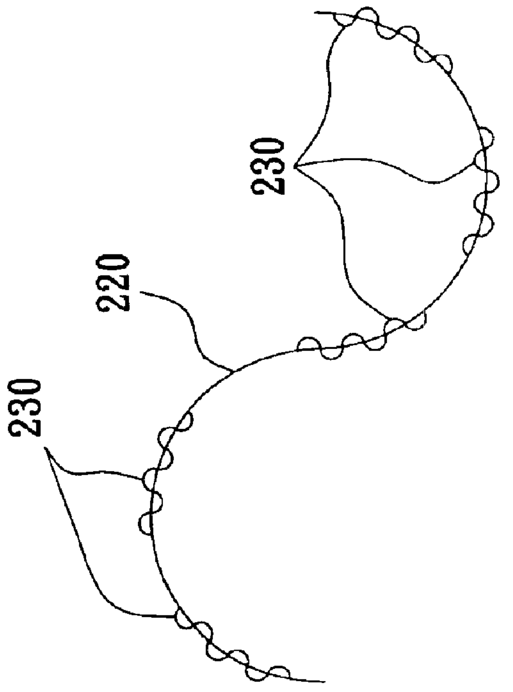
FIG. 3*b* is a waveform diagram of a signal outputted from an output terminal of the electric power generating circuit in accord with the present invention.

Please refer to FIGS. 3*a* and *b*. FIG. 3*a* is a schematic diagram of a circuit for generating the electric control signal in accord with the present invention. FIG. 3*b* is a waveform diagram of a signal outputted from an output terminal of the electric power generating circuit in accord with the present invention. When the city electricity with 110V is sent to the primary side of the transformer 200, the secondary side of the transformer 200 will produce a voltage with 12V, which can provide the electricity to the track lamps 130. Therein, the secondary side of the transformer 200 is connected to a control panel 210 for adding a control signal inputted. Hence, an outputted signal with the waveform shown in FIG. 3*b* is produced. The outputted signal includes a low-frequent electric power signal 220 and a high-frequent control signal 230 to form the electric control signal mentioned above. Hence, the circuit for generating the electric control signal combined with the circuit shown in FIG. 2 can form a track lamp control module to provide electricity to the track lamps 130 and control the light-emitting mode of the track lamps 130.

Figure 4:
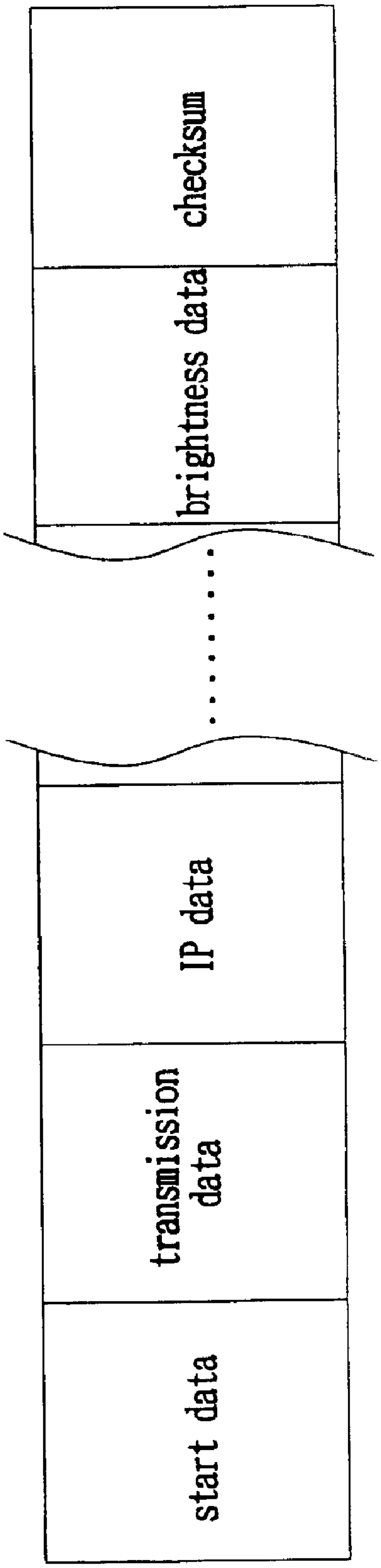
FIG. 4 is a structure diagram of a control signal in accord with the present invention.

Please refer to FIG. 4, which is a structure diagram of a control signal in accord with the present invention. The control signal is transmitted in a form of packet. The start data of the packet represent a start of the packet. The transmission data represent the transmitted data. The IP data indicate those track lamps controlled by the packet. The brightness data can control the brightness of the track lamps 130. Lastly the checksum is used to check the correctness of the packet. In practice, the packet can include the moving distance or light-projecting angle of the track lamps 130 or the like.

Figure 5:
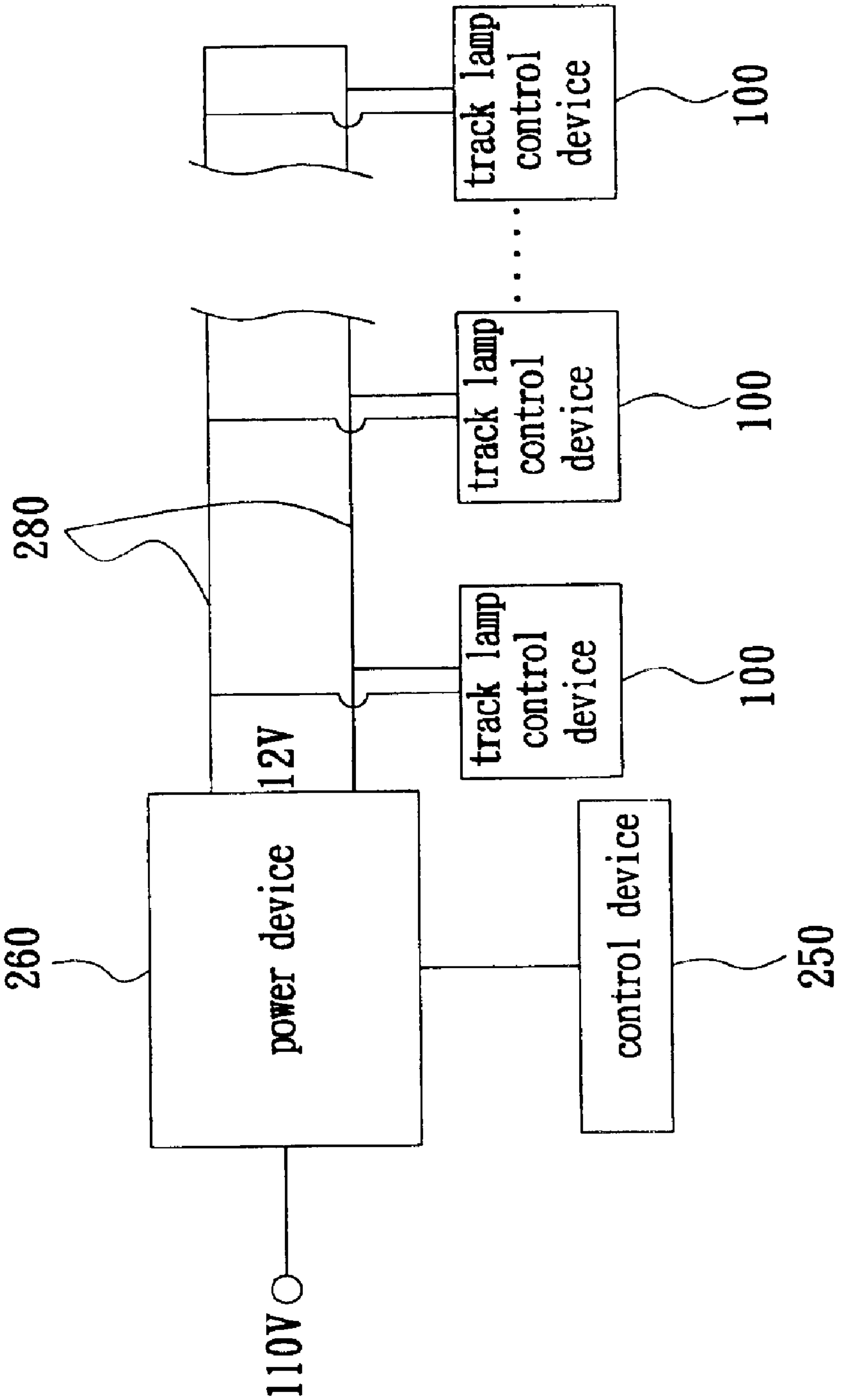
FIG. 5 is a circuit block diagram of a track lamp control module in accord with the present invention.

Please refer to FIG. 3 and FIG. 5, which is a circuit block diagram of a track lamp control module in accord with the present invention. When the city electricity with 110V is sent to the power device 260, it will be transformed into the electric power signal 220 with 12V by the transformer 200 within the power device 260 and then be sent to the track lamp control devices 100 via the track 280 to provide them electricity. The control device 250 is connected with the power device 260 and provides a man-machine interface for a user to input a control signal 230 to make the track lamp control devices 100 control the light-emitting order, brightness and light-projecting angle of the track lamps to enhance the light effect.

Summing up, the track lamp control device of the present invention can control the light-emitting order, brightness and light-projecting angle of the track lamps to enhance the light effect and it isn't disclosed in a published material or used in public. Hence, the present invention conforms the patent law for submission.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A device for controlling track lamps comprising:

a low pass filter for obtaining a low-frequency signal from an input signal;

a high pass filter for obtaining a high-frequency signal from the input signal;

a microprocessor connected with the high pass filter to process the high-frequency signal;

an Internet Protocol (IP) setting circuit connected with the microprocessor for providing a user interface to set IP addresses of the track lamps, the IP setting circuit accepting an input of the IP addresses and an order of the track lamps from an external device selected from the group consisting of a computer, a cellular phone, a personal digital assistant (PDA) and a control panel; and a plurality of pulse modulation processors for receiving the processed high-frequency signal sent from the microprocessor and modulating a pulse width of the processed high-frequency signal;

whereby the light-emitting order, the brightness and a light-projecting angle are controlled to enhance a presented light effect.

2. The device as claimed in the claim 1, wherein the input signal, which is an electric control signal, comprises a low-frequency electric power signal and a high-frequency control signal.

3. The device as claimed in the claim 1, wherein the low pass filter is connected with a rectifier for rectifying the low-frequency signal.

4. The device as claimed in the claim 3, wherein the rectifier is connected with the track lamps to provide the track lamps electricity.

5. The device as claimed in the claim 4, wherein the track lamps are light emitting diodes (LEDs).

6. A track lamp control module comprising:

a control device for providing a man-machine interface;

a low pass filter for obtaining a low-frequency signal from an input signal;

a high pass filter for obtaining a high-frequency signal from the input signal;

a microprocessor connected with the high pass filter to process the high-frequency signal;

an IP setting circuit connected with the microprocessor for providing a user interface to set IP addresses of the track lamps, the IP setting circuit accepting an input of the IP addresses and an order of the track lamps from an external device selected from the group consisting of a computer, a cellular phone, a personal digital assistant (PDA) and a control panel; and a plurality of pulse modulation processors for receiving the processed high-frequency signal sent from the microprocessor and modulating a pulse width of the processed high-frequency signal;

whereby the light-emitting order, the brightness and a light-projecting angle are controlled to enhance a presented light effect.

7. The track lamp control module as claimed in the claim 6, wherein the input signal, which is an electric control signal, comprises a low-frequency electric power signal and a high-frequency control signal.

8. The track lamp control module as claimed in the claim 6, wherein the low pass filter is connected with a rectifier for rectifying the low-frequency signal.

9. The track lamp control module as claimed in the claim 8, wherein the rectifier is connected with the track lamps to provide the track lamps electricity.

10. The track lamp control module as claimed in the claim 6, wherein the track lamps are LEDs.

* * * * *